United States Patent [19]
Hamilton et al.

[11] Patent Number: 6,038,607
[45] Date of Patent: *Mar. 14, 2000

[54] METHOD AND APPARATUS IN A COMPUTER SYSTEM HAVING PLURAL COMPUTERS WHICH CAUSE THE INITIATION OF FUNCTIONS IN EACH OTHER USING INFORMATION CONTAINED IN PACKETS TRANSFERRED BETWEEN THE COMPUTERS

[75] Inventors: Patrick Hamilton, Machida; Junji Nakagoshi, Hadano; Tatsuo Higuchi, Fucyu; Toshimitsu Ando, Isehara; Masaaki Iwasaki, Tachikawa, all of Japan

[73] Assignee: Hitachi, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/407,841

[22] Filed: Mar. 21, 1995

[30] Foreign Application Priority Data

Mar. 24, 1994 [JP] Japan .................................. 6-053409

[51] Int. Cl.[7] .............................. G06F 15/16; G06F 9/46
[52] U.S. Cl. ......................... 709/236; 709/212; 709/216; 710/260
[58] Field of Search ................................ 395/200, 200.2, 395/200.18, 820, 200.41, 200.42, 200.46, 200.47, 200.66, 200.73, 200.75, 876, 74; 709/212, 215, 201, 216, 236, 211, 245, 250, 217, 243; 711/129, 153; 710/22, 24, 56, 267, 268, 260

[56] References Cited

U.S. PATENT DOCUMENTS

| | | | |
|---|---|---|---|
| 4,989,135 | 1/1991 | Miki | 710/22 |
| 5,151,899 | 9/1992 | Thomas et al. | 370/394 |
| 5,283,869 | 2/1994 | Adams et al. | 709/237 |
| 5,386,566 | 1/1995 | Hamanaka et al. | 709/300 |
| 5,396,490 | 3/1995 | White et al. | 370/474 |
| 5,410,536 | 4/1995 | Shah et al. | 370/216 |
| 5,410,650 | 4/1995 | Sasaki et al. | 709/250 |
| 5,412,782 | 5/1995 | Hausman et al. | 709/250 |
| 5,530,809 | 6/1996 | Douglas et al. | 709/250 |
| 5,659,777 | 8/1997 | Iwasaki et al. | 709/226 |

FOREIGN PATENT DOCUMENTS

| | | |
|---|---|---|
| 0502215 | 9/1992 | European Pat. Off. . |
| 2110442 | 6/1983 | United Kingdom . |

*Primary Examiner*—John A. Follansbee
*Attorney, Agent, or Firm*—Antonelli, Terry, Stout & Kraus, LLP

[57] ABSTRACT

To reduce an overhead of the interrupt on a processor associated with packet send and receive control in a network, a packet send command chaining unit is provided. Based on the control field in each packet send command, a send node controls an interrupt request to the processor in the packet level and sends a packet set with the control information to a receive node. Based on the control field in the received data packet, the receive node controls a receive circuit interrupt request, thereby reducing the number of times the interrupt on the instruction processor is caused for each packet send and receive operation.

6 Claims, 7 Drawing Sheets

METHOD AND APPARATUS IN A COMPUTER SYSTEM HAVING PLURAL COMPUTERS WHICH CAUSE THE INITIATION OF FUNCTIONS IN EACH OTHER USING INFORMATION CONTAINED IN PACKETS TRANSFERRED BETWEEN THE COMPUTERS

BACKGROUND OF THE INVENTION

1. Field of the Invention

The present invention relates to a computer system comprising a plurality of computers interconnected by a network and, more particularly, to a computer system wherein many computers transfer packets to each other via local and global networks.

2. Description of the Related Art

Figure 2:
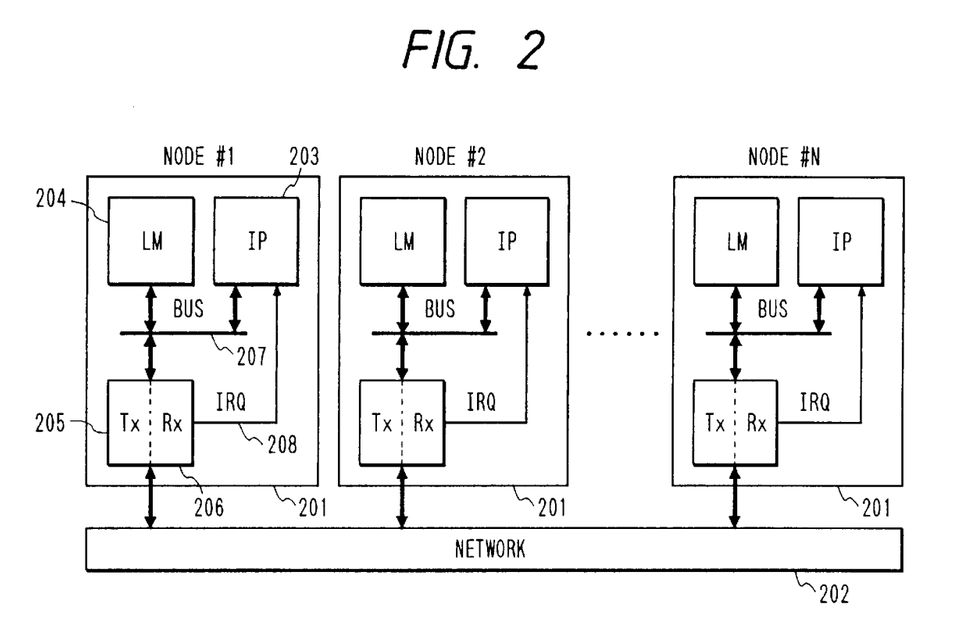
FIG. 2 is a block diagram illustrating an example of the constitution of the conventional hardware unit.
Figure 3:
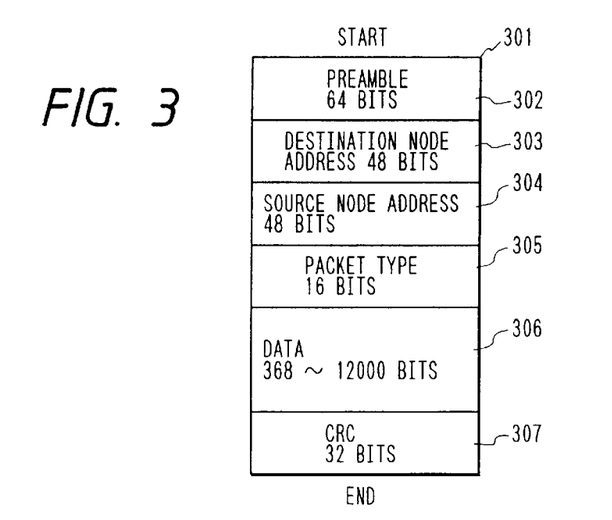
FIG. 3 is a diagram illustrating an example of the constitution of the conventional packet format.

Now, referring to FIG. 2, there is shown a conventional computer network in which a plurality of nodes 201 (node #1, node #2, ... node #N) are linked to each other via a network 202. Each of the plurality of nodes 201 includes an instruction processor (IP) 203, a local memory (LM) 204, a transmit circuit (TX) 205, and a receive circuit (RX) 206 which are linked to each other via an address bus and a data bus 207. Referring to FIG. 3, there is shown the format of a data packet 301 for use in the network illustrated in FIG. 2. The packet 301 includes a preamble 302 containing a fixed bit pattern, a destination node address 303, a source node address 304, a packet type 305, a data field 306 fetched from the local memory 204 of a send node, and CRC (Cyclic Redundancy Checksum) 307. The data packet 301 is sent to the network by the transmit circuit (TX) 205 and received from the network by the receive circuit (RX) 206.

In what follows, the conventional art is described with reference to FIGS. 2 and 3.

In order to transfer the data packet 301 via the network 202, the instruction processor 203 of the send node forms an image of data to be sent in an output buffer in the local memory 204. Then, the instruction processor 203 issues a send command to the transmit circuit 205, the command includes information such as the address and packet type of the destination node, the location of the output buffer in the local memory 204, and the length of data field.

Receiving the send command, the transmit circuit 205 sets an in-transmission flag, fetches the data field from the output buffer in the local memory 204, and starts sending the data packet 301. When the send command has been completed, the transmit circuit 205 resets the in-transmission flag and outputs an interrupt request to the instruction processor 203 via an interrupt request signal line 208.

Meanwhile, the receive circuit 206 monitors the network 202. Detecting the packet 301, the receive circuit 206 synchronizes its circuit with the incoming data stream by using the preamble 302 and then receives the destination node address 303. Then, if this address matches an address unique to the receive node itself, the receive circuit 206 receives all the remaining portions of the packet.

The CRC is recalculated to check if the packet 301 has been received correctly. The result of the recalculation is compared with the CRC 307 at the end of the packet. The result of the comparison is used to generate a receive status flag for the packet. The send node address, packet type, data field length, receive status flag and data field thus received are stored in the input buffer in the local memory 204 of the receive node. Then, an interrupt request is issued to the instruction processor 203 via the interrupt request signal line 208.

In a conventional computer network system, a send node has no means for controlling, directly by hardware, an interrupt request or a status flag in a receive node. Hence, if the instruction processor in the receive node is waiting for a particular packet or the last packet in a packet group to be received, the instruction processor must wait for an interrupt request to be caused for each packet and, when the interrupt request has been caused, check the receive status flag to see if the received packet matches the requested packet by using packet type and the data field information, thereby determining whether the desired packet has been received or not. If a packet other than the desired one has come, the instruction processor must wait for a next interrupt. Consequently, an interrupt request made at receiving other than the desired packet imposes a heavy load on the processor in the receive node. That is, the unnecessary interrupt service and the check for a match between the received packet and the desired packet are a waste of time for the instruction processor.

Further, in the conventional computer network system, hardware control of a queue or chain of send commands for sending a plurality of packets is not provided, hence control of such a queue or chain requires instruction processor operation. Consequently, if one node must transmit a plurality of packets consecutively, the instruction processor must wait for an interrupt to be caused at the end of the packet transmission by the current send command before issuing the next send command. Servicing the interrupt wastes the instruction processors time. The transmit circuit in an idle state while the interrupt is being serviced, thereby is also wasting the transmit circuits time.

SUMMARY OF THE INVENTION

It is therefore an object of the present invention to provide apparatus for decreasing the interrupt overhead time for the instruction processor and the idle time in which the transmit circuit is kept idle between packets, and provide simple apparatus for checking packet status in send and receive nodes.

It is a more specific object of the present invention to provide a computer system composed of a plurality of processing nodes connected by a network, wherein for an instruction processor in a receive node to determine whether a desired packet has been received, the conventionally practiced instruction processor interrupt for each packet reception is not performed;

instead, the interrupt is caused for the instruction processor of the receive node when the desired packet has been received by the receive node.

It is another object of the present invention to provide a computer system composed of a plurality of processing nodes connected by a network, wherein, when a send node transmits a plurality of consecutive packets, a conventionally practiced interrupt on the instruction processor of the send node performed each time a packet is transmitted is not required, thereby enabling continuous packet transmission.

It is still another object of the present invention to provide a computer system composed of a plurality of processing nodes connected by a network, wherein simple apparatus is provided for checking the send and receive states of the packets in the send and receive nodes.

It is yet another object of the present invention to provide a computer system composed of a plurality of processing nodes connected by a network, wherein apparatus is provided for decreasing an interrupt overhead time when a plurality of packets to be transmitted forms a group and that group is received in its entirety.

In carrying out the invention and according to one aspect thereof, there is provided a computer system composed of a plurality of processing nodes connected by a network, each of the plurality of processing nodes including: a processor; a send node apparatus for setting control information to a packet to be sent, the information indicating whether to cause an interrupt in a receive node; a send circuit for sending the packet set with the control information to the network from which the packet is transferred to another processing node; a receive circuit for receiving a packet transferred from another processing node via the network; and receive circuit unit for causing an interrupt on the processor according to the control information included in the received packet.

In carrying out the invention and according to another aspect thereof, there is provided a computer system composed of a plurality of processing nodes connected by a network, each of the plurality of processing nodes including: a processor; a receive circuit for receiving a packet transferred from another processing node via the network; a storage unit for storing a plurality of receive status flags for indicating a receive status of a packet received by the received circuit; a send node unit for setting control information to a packet to be sent, the control information indicating an address of the storage unit for storing a receive status flag to be referred to when receiving the packet in a receive node; a send circuit for sending the packet set with the control information to the network from which the packet is transferred to another processing node; a setting unit for setting the receive status flag in the storage unit at the address specified by the control information of the packet received by the receive circuit, the receive status flag indicating the receive status of the packet received by the receive circuit; and a referencing unit for causing the processor to reference the receive status flag in the storage unit.

In carrying out the invention and according to still another aspect thereof, there is provided a computer system composed of a plurality of processing nodes connected by a network, each of the plurality of processing nodes including: a processor; packet control unit for controlling a plurality of packets to be sent consecutively; a send circuit for sending, based on the packet control unit, the plurality of packets to be sent to the network from which the plurality of packets are transferred to another processing node; and a receive circuit for receiving a packet sent from another processing node. In this computer system, the packet control unit may have send commands provided for the plurality of packets to be sent consecutively. The send commands are chained corresponding to the plurality of packets to be sent consecutively. Each of the commands contain a field for indicating whether the command of concern is a last command of the command chain or the command is followed by another send command. In this computer system, each of the plurality of processing nodes may further include: a send interrupt control unit for indicating whether to cause an interrupt on the processor for each of the plurality of send packets to be sent consecutively; and a send interrupt circuit for causing an interrupt on the processor according to the indication made by the send interrupt control unit. In addition, in this computer system, if a plurality of packets are sent consecutively, it is desirable to set an indication for making a last packet of the plurality of packets to cause the interrupt to the send interrupt control means.

In carrying out the invention and according to yet another aspect thereof, there is provided a computer system composed of a plurality of processing nodes connected by a network, each of the plurality of processing nodes including: a processor; a send circuit for sending a packet to the network from which the packet is transferred to another processing node; a receive circuit for receiving a packet transferred from another processing node via the network; a storage unit for storing a plurality of send status flags indicating send status of packets sent by the send circuit; an address unit for holding addresses in the storage unit at which the plurality of send status flags are stored for packets to be sent, the address unit being used when setting the plurality of send status flags to the storage unit; a flag setting unit for setting the plurality of send status flags to the addresses held by the address unit when the send circuit sends the packet; and a referencing unit for causing the processor to reference the receive status flag of any of the packets sent by the sent circuit.

In carrying out the invention and according to a separate aspect thereof, there is provided a computer system composed of a plurality of processing nodes connected by a network, each of the plurality of processing nodes including: a send node unit for setting control information to a packet to be sent, the control information indicating that the packet constitutes a particular group; a send circuit for sending the packet set with the control information to the network from which the packet is transferred to another processing node; and a receive circuit for receiving a packet transferred from another processing node via the network and determining whether all packets constituting the group have been received by using the control information of the received packet. The receive circuit may have a counter for counting the number of packets received, accesses the counter by using an address of the counter included in the control information, counts the number of received packets constituting the group, and compares a total number of packets included in the control information with a count value obtained by the counter to determine whether all packets constituting the group have been received.

The above-mentioned novel constitution allows a plurality of send commands to be chained to transmit from the instruction processor to the transmit circuit a plurality of packets with a single request while maintaining a send status flag for each packet, and issue an instruction processor interrupt request when desired.

The above-mentioned novel constitution also allows a plurality of packets to be sent by a command chain that can be started by a single write command to the transmit circuit, thereby decreasing the idle time of the transmit circuit. A send interrupt enable bit contained in each send command makes a packet to be sent at the end of a packet group cause an interrupt request and prevents a packet immediately before the last packet from causing an interrupt request, thereby decreasing the interrupt overhead time of the instruction processor of a send node. The introduction of the command chain allows the send status flag for each packet to give the instruction processor of a send node the prompt means for checking the send status of a given packet at a given time.

Similarly, the receive circuit can interrupt the instruction processor only when a particular packet has come. The interrupted instruction processor can check the receive status flag corresponding only to the particular packet, thereby checking that packet. As a result, the send node controls the interrupt and status flag in the receive node such that the interrupt request for the last packet in the packet group to be received is enabled, the interrupt request of the packet immediately before the last packet is disabled, and the prompt means for checking the receive status of a given packet at a given time is provided to the instruction processor.

The above and other objects, features and advantages of the present invention will become more apparent from the accompanying drawings, in which like reference numerals are used to identify the same or similar parts in several views.

DESCRIPTION OF THE PREFERRED EMBODIMENTS

This invention will be described in further detail by way of example with reference to the accompanying drawings.

Figure 1A:
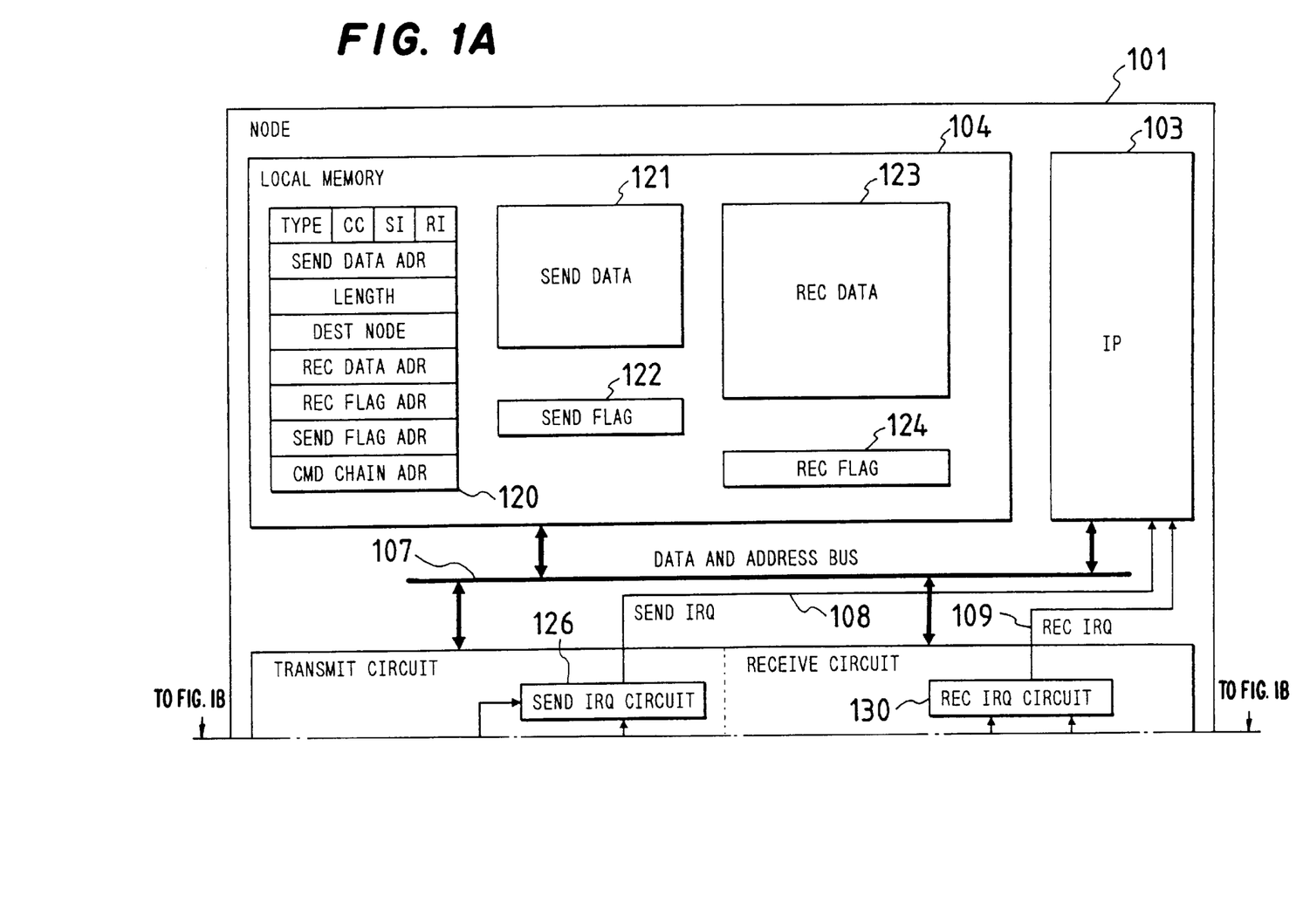
FIG. 1 is a block diagram illustrating a hardware unit with the present invention incorporated.
Figure 1B:
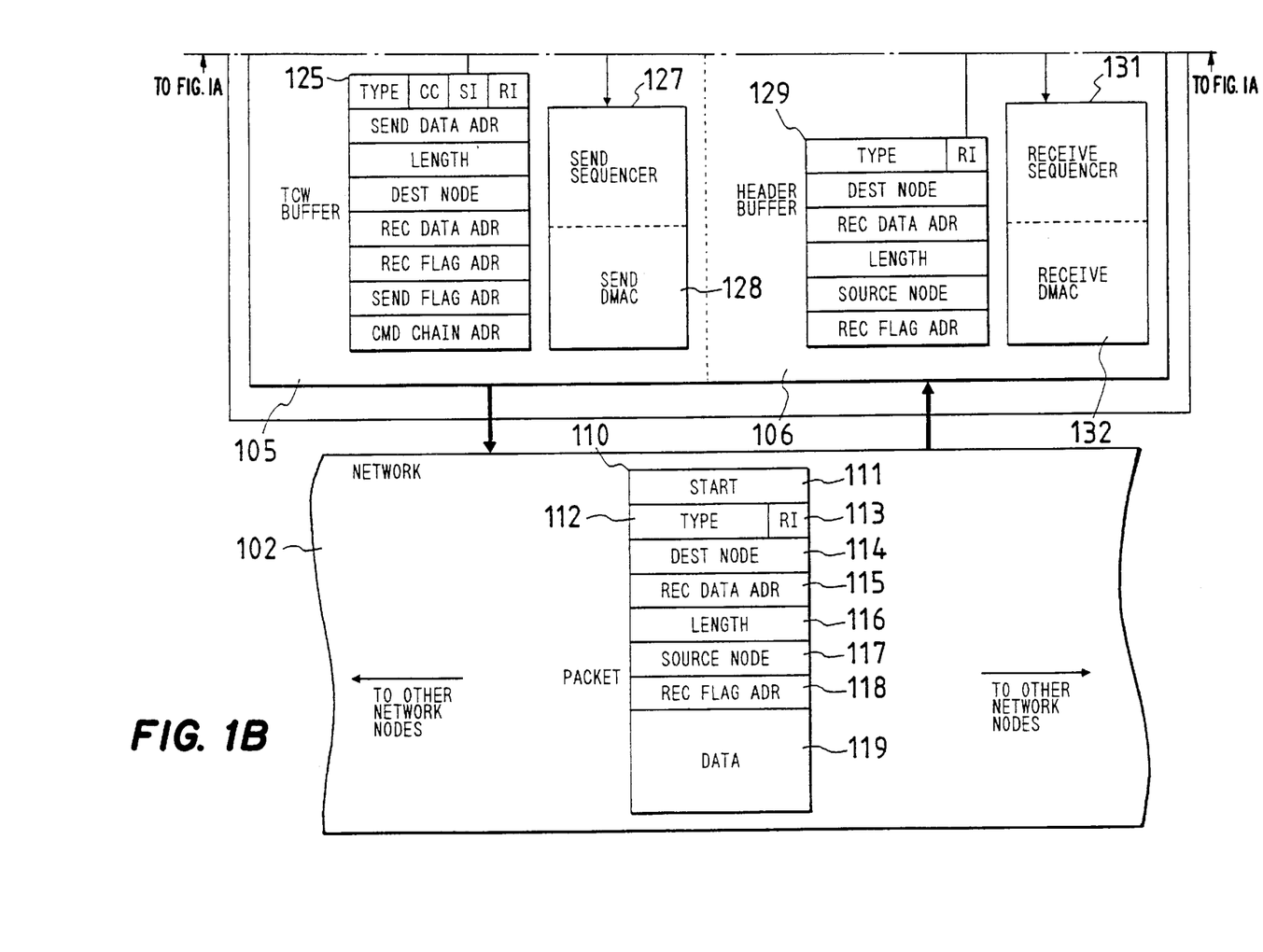

Now, referring to FIG. 1, there is shown the block diagram of the computer system practiced as one preferred embodiment of the present invention. This embodiment is composed of a plurality of nodes connected by a network 102. For convenience of description, only one node 101 is shown. The node 101 is used to indicate both a send node and a receive node. In an actual system, the nodes are disposed in physically different locations between which packets are transferred. The node 101 includes an instruction processor 103, a local memory 104, a transmit circuit 105, and a receive circuit 106. A data and address bus 107 outputs a command to the transmit circuit 105, transfers data between the instruction processor 103 and the local memory 104, and transfers data between the local memory 104 and the transmit circuit 105 and the receive circuit 106. Interrupt request lines 108 and 109 are provided to allow the transmit circuit 105 and the receive circuit 106 to interrupt the instruction processor 103.

The network 102 receives a packet 110 from the transmit circuit 105 in the node 101 and sends the packet to the receive circuit 106 of another node 101 according to the contents of a destination node field 114 contained in the packet 110. The network 102 transfers the packet 110 to the receive circuit 106 in the order of transmission.

Figure 4:
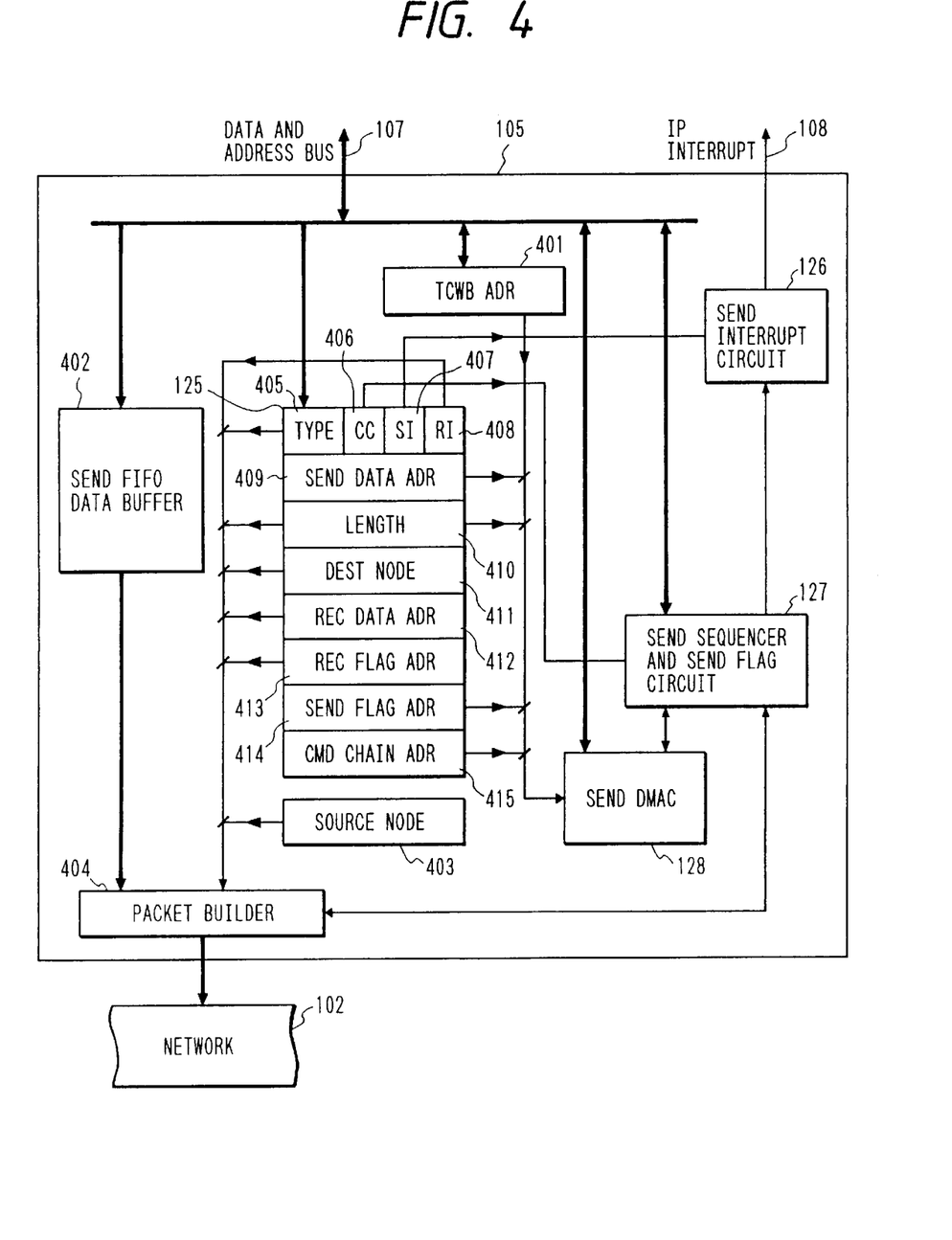
FIG. 4 is a block diagram illustrating the transmit circuit.

Now, referring to FIG. 4, there is shown the block diagram of the transmit circuit 105. A send sequencer 127 controls the entire transmit circuit 105, including the control over writing of a send status flag 122 indicating the send status of each packet. A send command takes a form of a transfer control word block 120(hereinafter referred to as TCWB), which is stored in the local memory 104 by the instruction processor 103.

A TCWB address register 401 holds an address of the TCWB 120, which is writable by the instruction processor 103. A TCWB buffer 125 is a register file for temporarily holding a copy of the TCWB 120. This register file, the same as the TCWB in format, includes a packet type 405 for indicating the type of a packet to be transferred, a command chain enable bit 406 for indicating whether the TCWB for controlling the packet has another TCWB chained, a send interrupt enable bit 407 for indicating whether the packet send circuit should interrupt the instruction processor, a receive interrupt enable bit 408 for indicating whether the receive circuit that receives the packet should interrupt the instruction processor, a send data address 409, a data length 410 for indicating the data length of the packet to be sent, a destination node number 411, a receive data address 412, a receive flag address 413, a send flag address 414, and a command chain address 415 for indicating the address of a next TCWB.

A send interrupt circuit 126 controls an interrupt timing on the instruction processor 103 by using the send interrupt enable 407 contained in the TCWB buffer 125. A data buffer 402 is a first-in, first-out (FIFO) data buffer and is used as the buffer for the data transferred between the local memory 104 and the network 102. A send direct memory access controller (DMAC) 128 can write to the local memory 104 the send status flag 122 for indicating the send status at send termination (including both normal termination and abnormal termination). Also, the send DMAC 128 can perform a block read operation; namely, the send DMAC can read blocks of data of the send packet from the local memory 104. To implement this block read operation, the send DMAC 128 includes a length counter and an address counter which are initialized to the length of a block concerned and the start address of the block concerned, respectively.

A command for requesting a block transfer to the send DMAC 128 is sent from the send sequencer 127. An address parameter of the command is obtained from the TCWB buffer 125 and a length parameter is obtained from the sequencer 127 or the TCWB buffer 125. For the block read operation, a local memory read request is generated by using a current value of the address counter which is outputted from the send DMAC 128 to the address and data bus 107. Then, the value in the address counter in the send DMAC 128 is incremented, the value in the length counter in the send DMAC 128 is decremented and the block read operation is continued until the length reaches zero.

The data read from the local memory 104 is stored in the TCWB buffer 125 or the data buffer 402 under the control of the send sequencer 127. A source node register 403 includes an identifier that is unique to each node 101 and identifies it. In the present embodiment, the node identifier is stored in the source node register 403 as a hard-wired number.

A packet builder 404 extracts information from the TCWB buffer 125 and the source node register 403 to build a packet header and fetches data from the FIFO data buffer 402 to build a packet body 119 and sends the complete packet 110 to the network 102.

Figure 5:
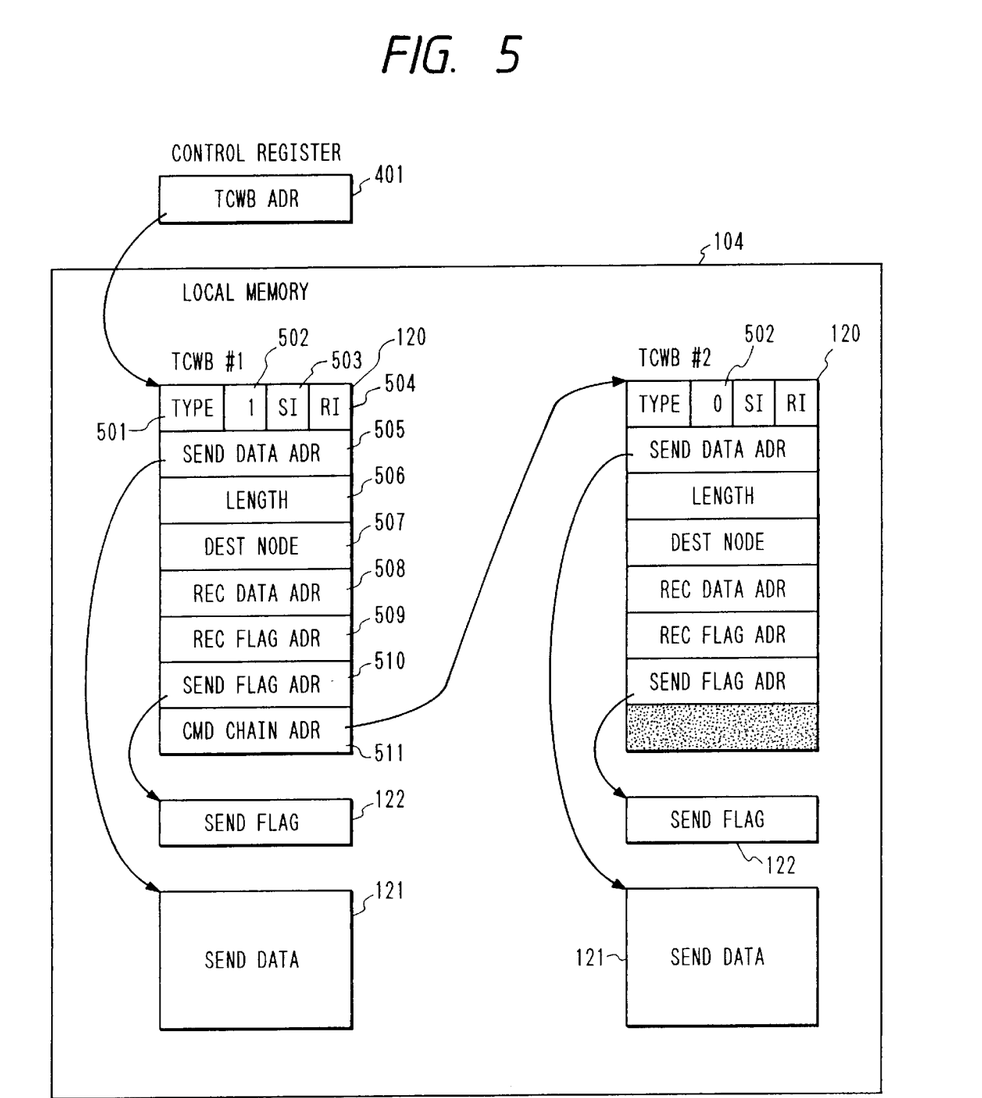
FIG. 5 is an operational diagram illustrating a command chain and a transfer control word block.

In order for the node 101 to send one or more data packets 110 to one or more other nodes, the instruction processor 103 in the send node 101 creates the TCWB 120 in the local memory 104 for each packet 110 to be transferred as shown in FIG. 5.

This instruction processor initializes each field contained in the TCWB 120. Referring to FIG. 5, a type field 501 is initialized to indicate the packet type. In the present embodiment, all packets are of the same type, and the type field 501 contains a fixed value.

A send data address field 505 points to the start position of the data 121 to be sent from local memory 104. A data length field 506 indicates the length of the data field to be transferred. A destination node field 507 identifies a destination node for the packet concerned. A receive data address field 508 indicates the position in local memory 104 of the destination node where the receive data 123 is to be stored. A receive flag address 509 indicates, for the destination node, a location in which a receive status flag 124 is to be stored. A send status flag address 510 indicates, for the transmit circuit 105, a location in local memory 104 at which the send status flag 122 is to be stored.

It is assumed that the receive flag address 509 is already known by the receive node and the send node through a negotiation between them performed before the start of the packet communication shown by the present embodiment. The send node can therefore set the receive flag address 509 for the packet. The receive node can quickly set the receive status flag 124 to a predetermined position by using the receive flag address 509 indicated in the received packet. The instruction processor in the receive node can immediately read the receive status of the received packet from the receive flag address that the instruction processor already knows by the above-mentioned previous negotiation. If the receive node performs packet communication with two or more send nodes, the receive node negotiates with each of the send nodes for a receive flag address. Consequently, if the receive node receives two or more packets continuously, the receive node can immediately determine the receive status of a packet coming from a desired send node by using the corresponding receive flag address. On the other hand, the send status flag address 510 is determined for each packet to be sent by the send node and stored before the packet communication shown in the present embodiment starts. The send node can thus immediately read the send status for each packet to be sent by using the send status flag address.

If there is a TCWB to be chained, a command chain address field 511 is set to point a next TCWB 120 and then the command chain enable bit 502 is set. If there is no command chain, the command chain enable bit is cleared. In FIG. 5, if the command chain enable bit 502 is "1", there is a command chain; if the bit 502 is "0", there is no command chain. TCWB #1 chains with TCWB #2, which is a next command, but TCWB #2 chains with no next command.

A send interrupt enable bit (SI) 503 should be set if an interrupt request is to be made to the instruction processor when the packet 110 corresponding to the TCWB 120 is sent; if not, the send interrupt enable bit 503 should be cleared. That is, before sending the packet, the instruction processor can control the send interrupt enable bit 503 to control the generation of an interrupt request to the instruction processor (own processor) at the time of transmission. The send status flag 122 is initialized to a value which indicates that the packet 110 has not been sent. Likewise, the receive flag address 509 points a value in the local memory 104 of the receive circuit of the destination node. The content indicated by the address 509 has been initialized to a value which indicates that the packet 110 has not been received.

To start a packet send process, the instruction processor 103 writes the address of the first TCWB 120 in the command chain to the TCWB address register 401 by using the address and data bus 107. This writing causes the send sequencer 127 to start its operation.

First, using the address written to the TCWB address register 401, the send sequencer 127 instructs the send DMAC 128 to fetch the first TCWB 120. The TCWB 120 is fetched from the local memory 104 via the address and data bus 107 to be stored in the TCWB buffer 125.

Next, using the send data address 409 and the length field 410 in the TCWB buffer, the send sequencer 127 instructs the send DMAC 128 to start a data fetch operation, stores the fetched data in the FIFO data buffer 402, and instructs the packet builder 404 to start sending the packet 110.

The packet builder 404 first sends a fixed start code 111 to mark the start of the packet 110. Also, the packet builder fetches a type field 112, a receive interrupt enable bit 113, a destination node number 114, a receive data address field 115, a data length field 116, source node number 117, and a receive flag address field 118 from the TCWB buffer 125 and the send node register 403 and sends the fetched information.

Then, the packet builder 404 fetches data from the send FIFO data buffer 402 and sends the fetched data to form the packet body 119. At the same time, the send FIFO data buffer 402 is filling with more data requested by the send DMAC 128 and read from the local memory 104.

The packet builder 404 notifies the send sequencer 127 of the completion of the operation. Then, the send sequencer 127 instructs the send DMAC 128 to write a value that indicates the completion of the transmission of the packet to the send status flag 122 by using the send status flag address 414 stored in the TCWB buffer 125. In the present embodiment, the send status flag 122 may have one of two possible values that mean the packet 110 has been sent or has not been sent. This send status flag is set regardless of the processing by the instruction processor. That is, the instruction processor need not to check the send status flag upon completion of the packet transmission; the processor need only to check the send status flag when necessary.

If the send interrupt enable bit 407 in the TCWB buffer 125 has been set, the send sequencer 127 issues an interrupt request to the instruction processor 103 via the send interrupt request line 108. At this moment, the command chain enable bit 406 is checked. If the command chain enable bit 406 is set, the packet send process is repeated from the point of fetching the TCWB 120. But, the send sequencer 127 instructs the send DMAC 128 to use the command chain address 415 stored in the TCWB buffer 125 instead of using the TCWB address register 401. If the command chain enable bit 406 is found cleared, the send process terminates and the send circuit 105 goes in to a state in which the send circuit is again ready to accept a new address to be written to the TCWB address register 401.

Consequently, if the send interrupt enable bit is cleared and the command chain enable bit 406 is set, multiple packets 110 can be sent to the network 102 consecutively without issuing an interrupt request to the instruction processor 103. As a result, consecutive packet communication may be performed without deteriorating the processing efficiency of the instruction processor. For example, if an interrupt is caused when the last packet has been sent, the processor is interrupted only once, thereby enhancing the processing efficiency of the processor.

The network 102 receives the packet 110 from the send circuit 105 and, according to the destination field 114, transfers the packet 110 to the receive circuit 106 of the destination node. In the present embodiment, the network 102 is constituted such that, when two or more packets 110 are transferred from one node to another, the packets are received by the receiving node in the order the packets have been sent.

Figure 6:
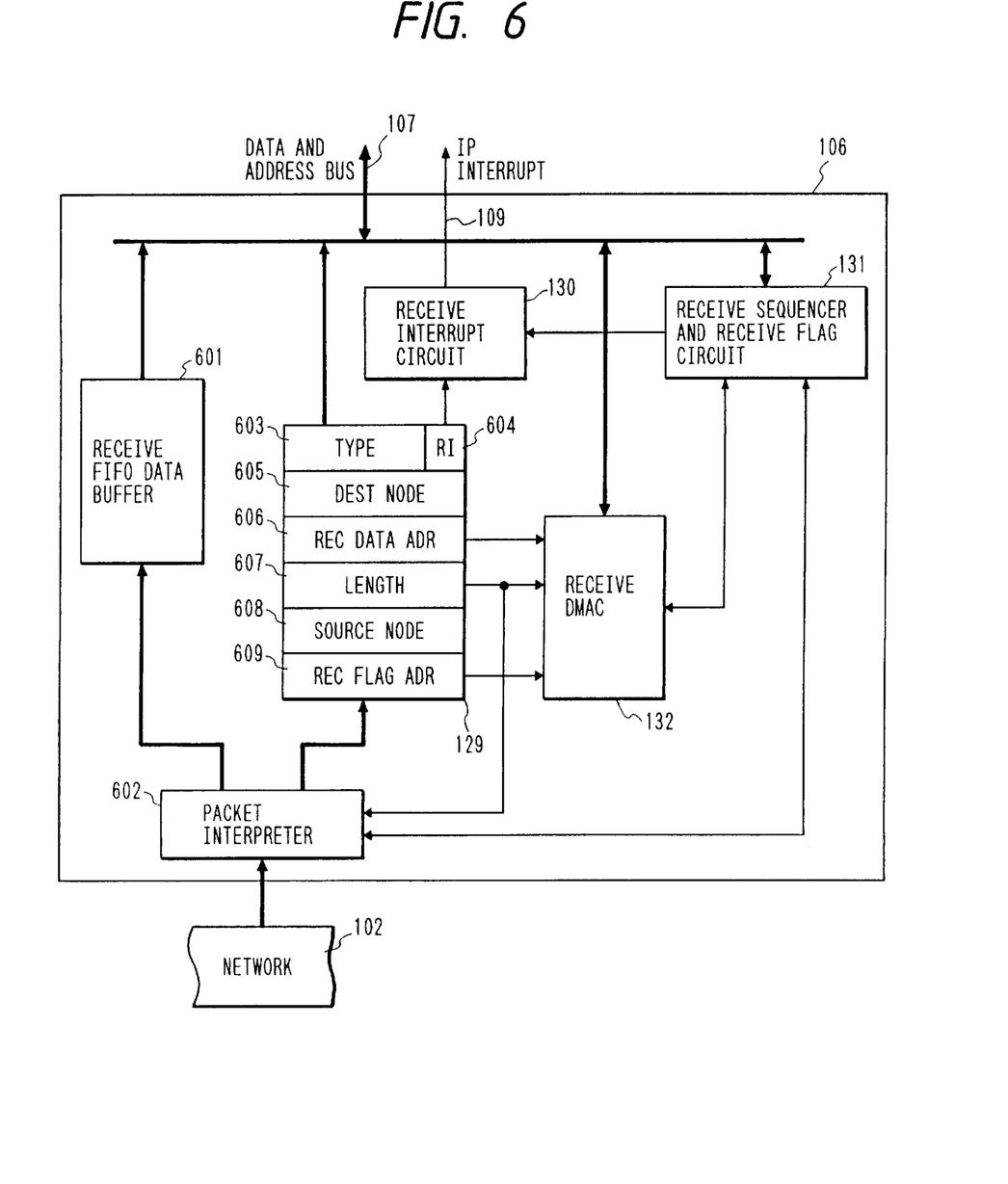
FIG. 6 is a block diagram illustrating the receive circuit.

Now, referring to FIG. 6, there is shown the block diagram of the receive circuit 106. A receive sequencer 131 controls the entire receive circuit 106 including the write timing of the packet receive status flag 124. A packet header buffer 129 is used to temporarily store a copy of the packet header. The format of this buffer is the same as that of the packet header and includes a packet type field 603, a receive interrupt enable bit 604, a destination node number 605, a receive data address field 606, a data length field 607, a source node number 608, and a receive flag address field 609.

A receive interrupt request circuit 130 controls the timing of interrupt to the instruction processor 103 by using the receive interrupt enable bit 604 contained in the packet header buffer 129. A receive data buffer 601 is a FIFO data buffer for buffering data coming from the network 102 before the data is written to the local memory 104.

A receive DMAC 132 writes the receive status flag 124 to the local memory 104 or block-writes data coming from the receive FIFO data buffer 601 to the local memory 104. The receive DMAC includes a length counter and an address counter, which are initialized to a block length and a block start address respectively.

A command to the receive DMAC 132 is issued from the receive sequencer 131, an address parameter is obtained from the packet header buffer 129, and a length parameter is obtained from the receive sequencer 131 or the packet header buffer 129.

As for the block write operation, a local memory write request is generated using the current value of the address counter of the receive DMAC 132 which is outputted together with data from the receive FIFO data buffer on the address and data bus 107, thereby writing the data in the receive FIFO data buffer 601 to the local memory. The address counter in the receive DMAC 132 is incremented and the length counter in the receive DMAC 132 is decremented. The wire operation by the DMAC 132 is repeated until the length reaches zero.

A packet interpreter 602 receives the packet from the network 102, removes the packet start marker 111 from the packet, stores the header in the header buffer 129, and stores the packet body 119 in the FIFO data buffer 601. The packet interpreter 602 includes a length counter so that the packet interpreter can determine the end of the packet. The length counter can be obtained from the header length and the data length 116.

Figure 7:
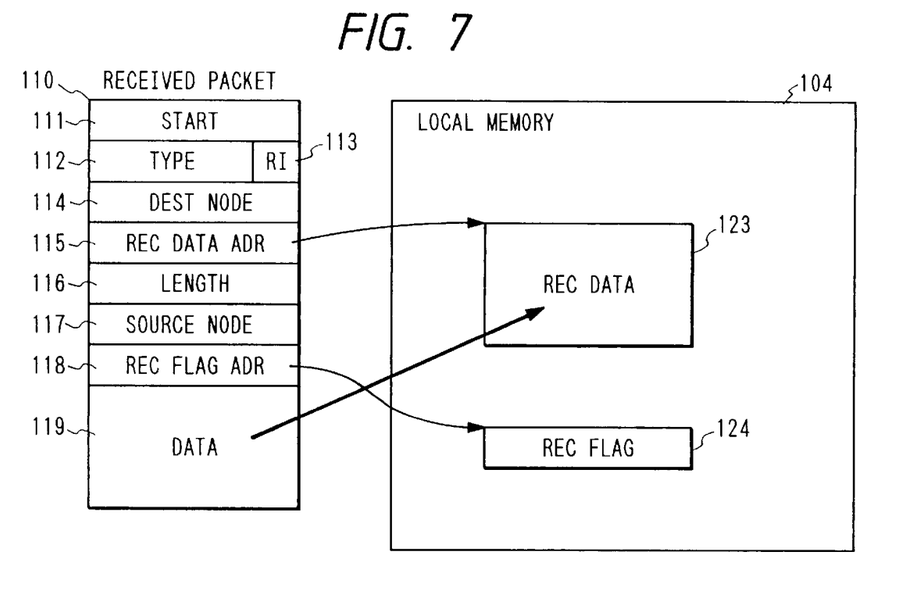
FIG. 7 is an operational diagram illustrating the receive circuit.

Now, referring to FIG. 7, there is shown operations of the receive circuit. Upon reception of the packet start marker 111, the packet interpreter 602 in the receive circuit 106 separates the marker from the rest of the packet and discards the separated marker. The packet header, that is, the portion of the packet other than the marker and the packet body, is stored in the header buffer 129. The packet interpreter 602 uses the data length field 607 stored in the packet header buffer to store the data portion of the packet in the FIFO data buffer 601 of the receive circuit. When the packet header has been received in its entirety, the receive sequencer 131 starts operating. The receive sequencer 131 uses the receive data address field 606 and the data length field 607 in the packet header buffer 129 to issue a command to the receive DMAC 132, thereby instructing the DMAC to write the received packet data from the FIFO data buffer 601 to the local memory 104.

When the length counter in the receive DMAC 132 has reached zero, it indicates that the entire data has been written from the receive FIFO data buffer to the local memory 104. The receive sequencer 131 uses the receive flag address 609 included in the header buffer 129 to issue a command to the DMAC 132, instructing the DMAC to write the receive status flag 124. Also, when the length counter in the receive DMAC 132 has reached zero, the receive interrupt request circuit 130 checks the receive interrupt enable bit 604 in the header buffer 129. If the receive interrupt enable bit 604 has been found set, the receive interrupt request circuit 130 issues an interrupt request to the instruction processor 103. If the bit 604 has been found not set, the receive interrupt request circuit 130 issues no interrupt request to the instruction processor 103. Subsequently, the receive circuit 106 initializes itself to get ready for receiving a next packet.

The instruction processor 103 of the destination node reads the receive status flag 124 of the packet 111 at a given time to check to see whether the packet has been received. Also, an interrupt from the receive circuit 106 allows the instruction processor to wait for a particular packet specified. In this case, the instruction processor may execute another task until the interrupt comes. This occurs when a packet having the receive interrupt enable bit 113 that is set is received.

Consequently, when the send node performs packet transmission, the receive interrupt enable bit is set or cleared to control the interrupt to the instruction processor in the receive node. For example, even when it is necessary to send a plurality of packets from the send node to the receive node to transmit a large quantity of data, the interrupt on the instruction process or in the receive node may be caused only when the first and last packets are received. To be more specific, the receive interrupt enable bit is set only to the first and last packets and cleared for all other packets. This requires the interrupt to the instruction processor only twice regardless of the number of packets to be sent. Also, control may be made such that only the last packet causes the interrupt. In this case, the interrupt is caused only once for the reception of all packets. As a result, the effect of the interrupt at packet reception onto the instruction processor may be minimized.

The present embodiment is advantageous in that the number of times the interrupt on the instruction processor is caused is reduced in both the send and receive nodes. The present embodiment also provides simple means for checking status of any packet in the send or receive node.

In addition, in the present embodiment, the send and receive interrupt enable fields 503 and 504 are one bit each. These fields can be extended to a plurality of bits for example so that control of a higher level is performed. To be specific, two bits are assigned to each of the send and receive interrupt enable fields 503 and 504 to provide four interrupt levels "00", "01", "10", and "11". These interrupt levels are then prioritized such that an interrupt by the transmission of an emergency signal (a sync signal between processors for example) is preferred with priority by way of example. In another example, signal types may be assigned to the interrupt levels.

Figure 8:
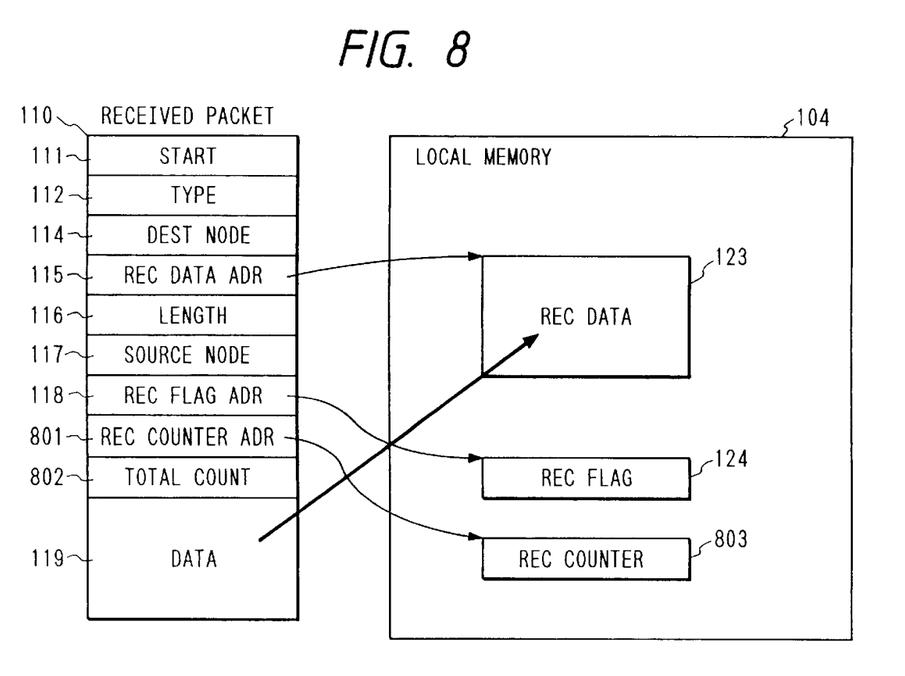
FIG. 8 is an operational diagram illustrating another packet format and another receive circuit.

Now, referring to FIG. 8, there is shown another preferred embodiment of the present invention. This second embodiment is suitable for a system having the network 102 for which it is unnecessary to guarantee that the packet send or receive sequence is the same between two nodes or a system in which a packet group enters not at a single source node but various source nodes and therefore the packet send sequence is random. In this embodiment, the receive interrupt enable bit 504 in the TCWB 120 of FIG. 5 is replaced with a receive counter address 801 and the receive interrupt enable bit 113 with a total packet count 802. The operation of the receive circuit 106 is changed as described below. The rest is the same as the first embodiment described above.

The receive counter address 801 points to a value (or an address) in the local memory of the receive node, the value indicating the number of packets in a packet group currently being received. The total packet count 802 indicates the total number of packets constituting the packet group. Consequently, all packets in the group are assigned with the same receive counter address 801. And the receive circuit can increment (by one for example) a value 803 pointed by the receive count address each time a packet is received, thereby counting the number of packets received so far in each packet group. When the count thus obtained becomes equal to the total count (the total packet count 802) of the packets constituting that packet, an interrupt meaning the reception of all packets in that group is caused. This setup allows an interrupt to be caused only when all packets constituting a packet group has been received, providing more efficient packet processing than the case in which an interrupt is caused for the reception of each packet.

In the first embodiment, the send status flag 122 and the receive status flag 124 indicate the completion of transmission and the completion of reception respectively. These status flags can be written to at different times during the send process and the receive process. For example, these flags can have additional values defined that are used for indicating whether a packet is in the process of being sent or being received, for error handling or for debugging.

As described in the computer system according to the present invention, each of the plurality of processing nodes includes: send node means for setting control information to a packet to be sent, the information indicating whether to cause an interrupt in a receive node; a send circuit for sending the packet set with the control information to the network from which the packet is transferred to another processing node; a receive circuit for receiving a packet transferred from another processing node via the network; and receive circuit means for causing an interrupt on the processor according to the control information included in the received packet. Consequently, if the receive node requires an interrupt, the send node sets the interrupt request control information to the packet to be sent before transmission, thereby causing the interrupt in the receive node upon reception of the packet. On the other hand, if the receive node requires no interrupt, the send node sets the control information requiring no interrupt to the packet to be sent, resulting no interrupt upon reception of the packet by the receive node. As a result, the receive node has a conspicuous advantage that the number of times the interrupt on the processor from the receive circuit is reduced thereby reducing a processor overhead.

Further, in the computer system according to the present invention, each of the plurality of processing nodes includes: a receive circuit for receiving a packet transferred from another processing node via the network; a storage unit for storing a plurality of receive status flags for indicating a receive status of the packet received by the received circuit; send node means for setting control information to a packet to be sent, the control information indicating an address of the storage unit for storing the receive status flag of the packet in a receive node; a send circuit for sending the packet set with the control information to the network from which the packet is transferred to another processing node; setting means for setting the receive status flag to the storage unit at the address specified by the control information of the packet received by the receive circuit, the receive status flag indicating the receive status of the packet received by the receive circuit; and referencing means for the processor to reference the receive status flag in the storage unit. Consequently, the processor need not reference the receive status immediately after reception of the packet and can quickly know the status of any received packet.

Still further, in the computer system according to the present invention, each of the plurality of processing nodes includes: packet control means for controlling a plurality of packets to be sent consecutively; a send circuit for sending, based on the packet control means, the plurality of packets to the network from which the plurality of packets are transferred to another processing node; and a receive circuit for receiving a packet sent from another processing node. Each processing node further includes the send interrupt control means for indicating whether to cause an interrupt on the processor corresponding to the plurality of send packets to be transmitted consecutively and the send interrupt circuit for causing the interrupt on the processor according to the send interrupt control means. Consequently, the number of conventionally required interrupts on the processor at packet transmission may be reduced, resulting in a conspicuous advantage of reduced processor overhead.

Yet, further, in the computer system according to the present invention, each of the plurality of processing nodes includes: a send circuit for sending a packet to the network; a receive circuit for receiving a packet transferred from another processing node via the network; a storage unit for storing a plurality of send status flags indicating send status of packets sent by the send circuit; address means for holding addresses in the storage unit at which the plurality of send status flags are stored for packets to be sent, the address means being used when setting the plurality of send status flags to the storage unit; flag setting means for setting the plurality of send status flags indicated by the addresses held by the address means when the send circuit sends the packet; and referencing means for the processor to reference the send status flag of any of the packets sent by the sent circuit. Consequently, the processor need not reference the send status of the packet immediately upon transmission of the packet and can promptly know the status of any received packet at any time.

Additionally, in the computer system according to the present invention, each of the plurality of processing nodes includes: send node means for setting control information to a packet to be sent, the control information indicating that the packet constitutes a particular group; a send circuit for sending the packet set with the control information to the network from which the packet is transferred to another processing node; and a receive circuit for receiving a packet transferred from another processing node via the network and determining whether all packets constituting the group have been received by using the control information of the received packet. Consequently, the interrupt on the processor need not be caused for each packet reception, resulting in a conspicuous advantage of reduced processor overhead.

While the preferred embodiments of the present invention have been described using specific terms, such description is for illustrative purposes only, and it is to be understood that changes and variations may be made without departing from the spirit or scope of the appended claims.

What is claimed is:

1. A computer system having a plurality of processing nodes connected by a network, each of said plurality of process nodes comprising:

a receive circuit for receiving a packet from said network, wherein said header portion of the packet includes a header portion having control information and a data portion and a receive interrupt field indicating whether to cause an interrupt in said another processing node upon receiving said packet to be sent;

storage unit for storing a plurality of receive status flags for indicating a receive status of said packet received by said circuit;

setting means for writing a receive status flag into said storage unit at an area specified by an address field included in said header portion of said packet received by said receive circuit;

send node means for setting control information to said header portion of a packet to be sent to another processing node via said network, said header portion includes an address field for specifying an area of the storage units for writing said receive status flag in said another processing node;

a send circuit for sending the packet to said another processing node via said network;

a processor for referring said receive status flag written in said storage unit; and a receive interrupt circuit for causing an interrupt in said processor according to said receive interrupt field included in said header portion of said packet received by said receive circuit.

2. A computer system having a plurality of processing nodes connected by a network, each of said plurality of processing nodes comprising:

a receive circuit for receiving a packet from said network, wherein said packet includes a header portion having control information and a data portion;

a storage unit for storing a plurality of receive status flags for indicating a receive status of said packet received by said receive circuit;

setting means for writing a receive status flag into said storage unit at an area specified by an address field included in said header portion of said packet received by said receive circuit;

send node means for setting control information to said header portion of a packet to be sent to another processing node via said network, said header portion includes an address field for specifying an area of the storage unit for writing said receive status flag in said another processing node;

a send circuit for sending the packet to said another processing node via said network;

a processor for referring said received status flag written in said storage unit; and packet control means for controlling consecutive sending of a plurality of packets to said another processing node via said network, wherein said send circuit consecutively sends, based on control from said packet control means, said plurality of packet to said another processing node via said network; and wherein said packet control means performs said control in response to a plurality of send commands for causing consecutive sending of said plurality of packets to said another processing node via said network, said send commands being chained together, one after another, in correspondence with a sequence said plurality of packets are to be consecutively sent to said another processing node via said network, thereby forming a send command chain, each of said send commands of said send command chain includes a chain field for indicating whether said send command is a last send command of said send command chain or a send command which is followed by another send command in said send command chain.

3. A computer system according to claim 2, wherein each of said send commands further comprises a interrupt field indicating whether to cause an interrupt in said processor upon sending of each of said plurality of packets; and a send interrupt circuit for causing an interrupt in said processor according to said interrupt field included said send commands.

4. A computer system according to claim 3, wherein, if said chain field included in said send command indicates that said send command is a last send command of said command chain, said interrupt field included in said send command indicates to cause an interrupt in said processing node.

5. A computer system composed of a plurality of processing nodes connected by a network, each of said plurality of processing nodes comprising:

a processor;

a send circuit for sending packets according to send commands provided by said processor to said network from which said packets are transferred to other processing nodes;

a storage unit for storing a plurality of send status flags used by said send circuit to indicate to said processor a send status of said packets sent by said send circuit;

wherein each of said send commands includes an address field specifying an area in said storage unit to write a send status flag; and flag setting means for writing the send status flag indicating the send status of a packet sent by said send circuit into said storage unit at the area specified by said address field included in a send command.

6. A computer system according to claim 5, wherein said processor refers said send status flag written in said storage unit.

* * * * *